April 26, 1960   W. C. BAUER   2,933,994
POLARIZED LIGHT PROCESS AND MEANS FOR PRODUCING STEREOGRAMS
Filed April 24, 1956
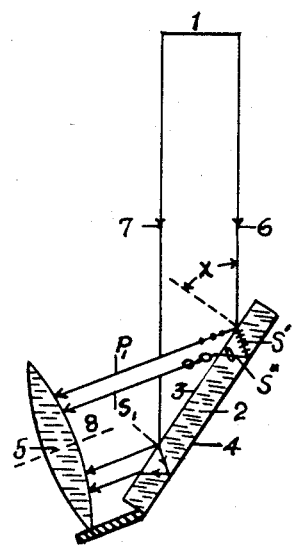
INVENTOR.
Wm Chas. Bauer

United States Patent Office 2,933,994
Patented Apr. 26, 1960

2,933,994

POLARIZED LIGHT PROCESS AND MEANS FOR PRODUCING STEREOGRAMS

William Charles Bauer, Coral Gables, Fla.

Application April 24, 1956, Serial No. 580,395

7 Claims. (Cl. 95—18)

This invention relates to the production of all types of photographs, transparencies, slides, motion picture films, and the like, which give the impression of solidity and relief, namely stereograms, which give the illusion of having three dimensional or stereoscopic characteristics.

An object of this invention is to provide a new polarized light photographic process and suitable polarizing means therefor to co-act with the objective lens of a camera whereby the said process is made effective so as to produce the type of single pictures which have stereogramic characteristics.

Another object of this invention is to provide a polarized light photographic process and polarizing means therefor to carry it into effect for photographing objects, not however, as is done in normal photography in forming a simple latent image with the oncoming parallel rays of "natural light" which has only one group of electric vector vibrations in all azimuths but all of which are in only one optical plane when it strikes the sensitive photo-film, but rather with specially and very highly polarized light which has been derived from the natural light by the co-acting polarizing means and which is polarized in two planes of polarization which are at right angles to each other and which has two groups of polarized coherent electric vectors vibrating at right angles to each other in space and at right angles to their respective planes of polarization.

In nature, light coming from a clear blue sky at right angles to the sun, and also light reflected from non-metallic objects contains some linearly polarized light in one optical plane. In normal photography, especially in color photography, this element mixed with the natural light is a disturbing factor, fading out some of the colors. To avoid this, so-called "Pola Screens" are placed on the camera lens to obstruct and to filter out this polarized light. The latent image is then made with pure natural light, which, when it strikes the photo-film, has electric vector vibrations in only one optical plane and the photo-electro-chemical-dynamic action on the silver ions results in a single simple molecular lattice arrangement of the silver grains.

In practicing my invention I do exactly the opposite. I provide a new photographic process and the necessary coacting polarizing means therefor to make it operative wherewith I eliminate the "natural light" as completely as possible and substitute therefor the totally polarized light vectors which have been derived from the oncoming parallel rays of natural light by the action of the optical polarizing means which co-acts with the camera objective lens. The type of polarizing means which is used not only blocks out the entrance of the natural light into the camera lens before admitting any light rays into the objective lens, but it transforms each incident ray into a pair of polarized coherent rays having their electric vector vibrations at right angles to each other in space and which are vibrating at right angles to their two respective planes of polarization, which are also at right angles to each other. Hence, there will be multiple pairs of such polarized coherent rays admitted into the camera lens to produce the latent image. Each pair will then be composed of the primary ray P and a secondary ray S and the multiple pairs will then be designated $P_1S_1$; $P_2S_2$; $P_3S_3$ and so forth. As they enter the camera lens, all like primary P components will be linearly polarized in the plane of incidence and all like secondary S components will be elliptically polarized in a polarizing plane at right angles to the said first plane and the P and S components will be at right angles to each other in space, or stating it another way, there will be two planes of polarization at right angles to each other, one for the P vectors and one for the S vectors, and the electric vector vibrations of the P and S vectors will be at right angles to their respective planes of polarization.

The Malus type is preferred because the secondary S components when they leave the polarizer to enter the camera lens comprise a rotary type of polarization which I have found to be a decided advantage, but the P components will remain linearly polarized. The Malus polarizer operates in accordance with the principle of "Polarization by Reflection" and as is well known, when it is adjusted so that the incident light strikes its first reflection surface at which is termed the "polarizing angle," maximum or practically total polarization is produced in both components. Therefore, in this invention the polarizer is thus adjusted on the camera lens to make this polarized light process effective.

The Malus polarizer which is used is made of the highest quality optical glass such as crown, flint, or other suitable glass and has its two parallel reflecting surfaces very highly polished so that the two boundary transition layers, usually referred to as the "surface films," will operate with the highest efficiency in the percentage of light reflected and in producing maximum or practically total polarization. The polarizer is mounted at the proper angle on and in front of the camera lens, in a light-tight casing open only to the incident rays and to the lens, so that the incident parallel light rays coming from the photographed object strike the first outer "surface film" at its "Polarizing Angle" for the kind of glass used thus forming the reflected linearly polarized component P of the coherent pair and Brewster's and Arago's law then applies and according to their theories " . . . if the angle of incidence at the first surface is the polarizing angle, the angle of incidence at the second inner surface film will be so also . . . ," therefore the secondary S components reflected therefrom are also practically totally polarized, and, as will be shown hereinafter, they are strongly elliptically polarized in the polarizing plane perpendicular to the polarizing plane of incidence which formed the P components.

For crown and flint glass having respectively a refractive index of 1.513 and 1.75, the polarizing angles are approximately 56°–30′ and 60°–10′; a good type has a polarizing angle of about 57° which I show in the drawing, as X.

Referring to the accompanying drawing, the illustration shown in merely schematic and diagrammatic; it indicates only the important elements involved, namely, the polarizer-lens optical system of this invention. It shows approximately the optical action of the polarizer in producing the kind of polarization herein disclosed, but disregarding certain refinements of the optical actions which are fully described in this specification. The diagram is exaggerated in dimensions so as not to crowd the illustration.

Referring to the drawing, 1 is an object to be photographed with the special polarized light herein disclosed, 2 is a Malus polarizer having a highly polished two transition boundary "surface films" 3 and 4 which in the form shown are parallel, 5 is the camera lens, 6 and 7 are two, taken as examples, oncoming parallel rays of "natural light" and as shown, strike the first outer reflecting film 3 at the "polarizing angle" of the glass used and which is assumed here to be approximately 57°. As herein disclosed in accordance with the theory of polarization by reflection, the primary ray $P_1$ is reflected at an angle of 57° and the linear polarization thereof is shown by the dots; that portion of the natural light $S'$ which enters the glass polarizer 2 is polarized in a plane of polarization which is at right angles to the first plane of polarization for the ray $P_1$ and this is shown by the short horizontal lines, but as described herein, since this ray $S'$ is linearly polarized when it strikes the rear inner surface film 4 it becomes by reflection elliptically polarized as $S''$ in the same plane of polarization which is shown by the small ellipse. The primary ray $P_1$ and the secondary ray $S_1$ which are parallel to each other represent the two members of a pair of coherent polarized components. What happens optically to ray 6 also happen to ray 7 and to all other oncoming rays, and each natural ray of light forms such a similar pair, hence in addition to the $P_1S_1$ group there will be others—$P_2S_2$, $P_3S_3$ and so forth, as set forth herein. These are then directed into the camera lens 5 which is so related in position with respect to the polarizer in order that all P and S components enter it parallel to its main optic axis 8, that is the camera is focussed for infinity. Then in accordance with the optical action of camera lenses a complex latent image will be formed on a photo-film within the said camera.

The very high polish of the polarizer was referred to previously. Theory and my photographic experiments show that there is a close relationship between the degree of polish and the degree of the stereogramic characteristics. High polish produces a very thin "surface film" which is very efficient and produces what is termed—"optical flatness" so that the degree of flatness is measurable in wave lengths of light. Such a surface has a very high reflective power as well as a very high polarizing value, and when photographs are made by my process the exposure factor need be no larger than two. According to Drude—" . . . if L is the thickness of the film in wave lengths of light, $\lambda$=wave length of light, $\bar{r}$=the coefficient of ellipticity (positive value for glass) and $n$=the index of refraction of the kind of glass used, then $$\frac{L}{\lambda} = \frac{\bar{r}}{\pi\sqrt{1+n^2}} \cdot \frac{n+1}{n-1}"$$

Applying this formula to flint glass, as an example, having a value of $n=1.75$ and $\bar{r}=0.03$ (it varies between 0.03 to 0.007) gives $L=0.0175$. Hence according to Drude—" . . . a transition layer of very small thickness is sufficient to account for a very strong elliptic polarization in reflected light." The S components of the multiple pairs of the coherent polarized pair will be elliptically polarized.

According to the accepted theories of Planck—"Physical optics is a special department of electro-dynamics—namely, that which comprises the laws of rapidly varying fields." A light vector is accompanied by an electric field (force or vibrations) and a magnetic field (force or vibrations) which are at right angles to each other. Wiener and others have shown that it is the electric vibrations and not the magnetic vibrations which cause the photo-electro-chemical effect on the sensitive silver salts or ions, which produces the latent photographic image. In normal photography we therefore have only one group of electric vibrations in all azimuths but only in one optical plane when the natural light rays strike the photo-film, therefore only a single molecular lattice arrangement results in the formation of the silver grains which make the latent image.

Planck treats my P and S waves (in his mathematics he refers to them respectively as the $f$ and the $g$ waves) very extensively to disclose their characteristic properties and optical actions, and concludes with the statement—"Thus these two kinds of waves behave quite independently of one another; each obeys its own laws." Therefore in my present process the explanation must be that two separate molecular lattice arrangements of the silver grains are produced, one by the P components and one by the S components, and these are displaced from each other by distances measured in molecular spaces. Such a complex vector action on the silver ions on the photo-film results in a double lattice molecular arrangement which appears to be a type of stereo-chemistry.

When such a complex latent image is properly processed into a negative, any type of contact positive print can be made therefrom, or it can be suitably processed into a positive depending upon the type of photo-film used. When a positive slide, for example, is viewed in a single lens magnifying viewer and the slide is illuminated with transmitted natural day light or artificial light a stereogramic picture is seen having a decided illusion of being three dimensional or stereoscopic. Slides may also be projected on a suitable screen. The stereograms produced by the process herein disclosed have an unusual and remarkable depth of focus, they are very sharp, clear, and distinct in the immediate foreground and also in the very distant background.

This invention differs radically from other polarized processes and a careful distinction should be considered. For example, in the two separate picture Polaroid process, for showing two separate pictures, it is necessary to have a left and a right view, which are more or less completely superimposed upon each other upon a viewing screen by the projection lantern. In such a process only one type of polarization is produced by the dichroic crystal polarizer, namely linear polarization in one plane. One picture, a left eye view is projected through one polarized screen which will permit, let us say, horizontal light vibrations to pass through, and the right eye view is projected with the same kind of vibration in the same plane, but the Polaroid sheet is revolved 90° so as to permit only vertical vibrations of light to pass through. Then stereoscopic pictures can only be seen by viewing the two superimposed pictures with respectively matched polarized eye analyzing glasses, whereas in my invention no special or matched viewing glasses are required.

It is to be understood that I do not wish to limit myself to the exact and precise details shown and described, and in the claims I wish to cover all the generic and specific features of the invention herein described, and to cover all statements of the scope of the invention in whatsoever language used to describe them, and while I show the use of a Malus type of polarizer I intend to include and to cover any suitable type or form of polarizer which would produce equivalent polarization, and I wish to include any variants or equivalents of any construction set forth which embodies this invention, for it is obvious that modifications may be made without departing from the spirit and scope of this invention.

What I claim:

1. In a photographic process for producing a molecularly complex single latent image with coherent polarized light rays the steps of placing a single plate optically-flat polarizer in front of the objective lens of a camera at such an angle that the oncoming natural light rays are intercepted and strike the polarizer at its proper characteristic angle so as to produce the most effective result in obtaining multiple groups of pairs of polarized coherent components which have their electric vectors vibrating perpendicular to their respective planes of polarization, focusing the camera at infinity, and directing said multiple groups into the camera in directions parallel to the objective lens axis so as to form the said image on the sensitive film therein.

2. The combination as set forth in claim 1 further characterized in that the said polarizer is a Malus polarizer having polished transition layers to give an effective value to the coefficient of ellipticity for the elliptical polarization produced thereby.

3. In a camera, in combination, an optical system comprising an objective lens and a coacting Malus polarizer, wherewith a single complex latent image is made on a photofilm in the camera with the resulting polarized light vector components into which the said polarizer, operating at or near its polarizing angle, divides each oncoming natural light ray, the said polarizer being highly polished so as to have on its light acting surfaces the proper thickness of transition films by the action of which some of said light vector components comprise linear polarized light and some components comprise elliptically polarized light, said polarizer being positioned to direct said components into the lens in directions parallel to the lens axis, and said lens being focused at infinity.

4. In a camera, in combination with its objective lens focused at infinity a coacting Malus polarizer which is positioned with respect to said lens so as to intercept the natural light rays coming from the object photographed and to have them strike the outer reflecting and refracting transition film of the polarizer at or near its polarizing angle and to direct the characteristically produced polarized light vector components into the said camera in directions parallel to the lens axis to have a single complex latent image produced on a photofilm therein, and the said polarizer having its front and rear surfaces highly polished so as to obtain thereon transition films of thickness such that an effective value of the coefficient of ellipticity $\bar{r}$ is obtained for the elliptically polarized light vector components which are produced by such films.

5. In a camera in combination, an objective lens focused at infinity and a Malus polarizer comprised of an optical plate of glass having unsilvered surfaces and the said plate mounted in front of said lens to intercept the oncoming incident natural light rays at its polarizing angle of reflection and direct the resulting characteristic polarized rays into the said camera in directions parallel to the lens axis.

6. In a camera in combination, an optical system comprising a suitable objective lens focused at infinity and a coacting Malus polarizer mounted with respect to said lens so that said polarizer operates at its maximum effect at its characteristic polarizing angle upon the incident rays of natural light coming from the scene photographed and allows the resulting parallel polarized light vectors to enter said camera parallel to the principal lens axis.

7. The combination as set forth in claim 6 further characterized in that the said Malus polarizer has its transition boundary surfaces highly polished so that at least one of the pair of coherent polarized light vectors into which each oncoming natural light ray is converted by the action of said polarizer comprises elliptically polarized light and the other comprises plane polarized light.

References Cited in the file of this patent

UNITED STATES PATENTS

| | | |
|---|---|---|
| 1,479,212 | Ames | Jan. 1, 1924 |
| 2,178,145 | Manly | Oct. 31, 1939 |
| 2,360,322 | Harrison | Oct. 17, 1944 |
| 2,468,046 | De Los Monteros | Apr. 26, 1949 |

FOREIGN PATENTS

| | | |
|---|---|---|
| #154 | France | July 16, 1902 |
| | (Addition to No. 314,161) | |
| 335,038 | Great Britain | Sept. 18, 1930 |
| 398,100 | Great Britain | Sept. 7, 1933 |

OTHER REFERENCES

Photographic Journal, volume 60, July 1936, pages 395–406.

Photographic Journal, March 1939, pages 121–131.

Journal of Motion Picture Engineers, volume 48, February 1947, pages 141–144.

Fundamentals of Physical Optics by Jenkins and White, 1937, pages 316, 317.